United States Patent [19]
de Haas

[11] 4,032,257
[45] June 28, 1977

[54] MILL, PARTICULARLY WINDMILL

[75] Inventor: Hendrik Antoon Lorentz de Haas, Loenersloot, Netherlands

[73] Assignee: B.V. vuro vorr Wetenschappelijke en Techische Ontwerpen Wto, Breukelen, Netherlands

[22] Filed: Dec. 9, 1975

[21] Appl. No.: 639,173

[30] Foreign Application Priority Data
Dec. 11, 1974  Netherlands .............. 7416097

[52] U.S. Cl. .............. 416/117; 416/111; 416/119
[51] Int. Cl.² .............. F03D 3/06
[58] Field of Search .......... 416/111, 117, 119, 17, 416/169, 172

[56] References Cited
UNITED STATES PATENTS

| | | | |
|---|---|---|---|
| 1,283,129 | 10/1918 | Fisher | 416/119 |
| 1,292,225 | 1/1919 | Araiza | 416/197 A |
| 1,341,045 | 5/1920 | Currey | 416/135 |
| 3,810,712 | 5/1974 | Hillman | 416/117 |

FOREIGN PATENTS OR APPLICATIONS

| | | | |
|---|---|---|---|
| 455,854 | 11/1928 | Germany | 416/133 |
| 13,700 | 6/1903 | United Kingdom | 416/119 |

*Primary Examiner*—Everette A. Powell, Jr.

[57] ABSTRACT

A mill, particularly windmill of the horizontal or Chinese type having a mill shaft supporting a vane rotor provided with a plurality of vane shafts rotatably mounted therein and with vanes secured to these vane shafts which vanes, when engaged by a wind flowing in a direction perpendicular to the mill shaft, will swing about their vane shafts from an operating position in which the vane is held by a stop on the rotor at an angle to the wind, to a free position parallel to the wind when reaching the lee-side of the rotor. Each vane shaft is coupled to an individual gear means carried by the rotor and engaging a stationary annular ring gear common to all gear means which gear means comprises a one-way free-wheel drive whereby when a vane swings about at the lee-side of the rotor an additional rotary driving force is transmitted to the latter.

15 Claims, 7 Drawing Figures

MILL, PARTICULARLY WINDMILL

BACKGROUND OF THE INVENTION

The invention generally relates to a mill intended to be driven by a flow of fluid. More in particular the invention relates to a windmill of the so-called horizontal or Chinese type. Windmills of this type comprise a vane rotor mounted for rotation in a stationary frame about a generally vertically extending central axis of this frame. The vane rotor supports a plurality of vane shafts rotatably mounted in the rotor and arranged in an annular array about the rotor axis, generally extending parallel to this axis. Each vane shaft carries a vane member with at least a major portion of the vane extending to one side of the shaft. Each vane may for instance comprise a rigid rectangular frame with a flexible sheet secured therein which frame is attached to its vane shaft along or adjacent one side member of the frame. The vane rotor further comprises stop means for each vane determining an operating position of the vane when held by the stop means while apart from this stop means the vane is free to swing about its vane shaft. In the operation of such a windmill the wind blowing from any direction but perpendicular to the axis of the vane rotor swings the vanes on one side of the rotor axis to their operating positions in which they engage the stop means and thus are held at an angle to the wind, generally in substantially radial planes whereas the vanes at the opposite side of the rotor axis are free to swing in positions parallel to the direction of the wind. The vanes in the operating position thus move with the wind and drive the vane rotor and the vanes in the free inoperative position move against the wind with a minimum of resistance. These latter vanes when reaching the weather side of the mill are gradually rotated about their vane shafts until they engage their stop means in the operating position while the vanes reaching the lee-side of the mill are swung around with a gybing movement from their operating position to a position parallel to the wind. The stop means can be so arranged that the vanes in their operating position extend substantially radially inwardly from their vane shafts towards the rotor axis in which case the vanes provide a driving couple through an angle of about 180° of their rotational movement about the rotor axis. In another embodiment of the Chinese mill, however, the stop means consist of a string attached to the vanes so as to restrict their rotational movement about the vane shaft to an angle of about 150° in such a way that in the operating position the vanes extend at a small angle to a radial line through the rotor axis and the vane shaft and that after gybing the vanes are at first held by the string in a position at an angle to the direction of the wind in which the vanes still contribute to the driving couple. In this arrangement the vanes each contribute a driving couple over an angular part greater than 180° of each revolution about the rotor axis.

In both cases, this type of windmill has the disadvantage that the vanes when passing the lee-side of the mill make an uncontrolled gybing movement which may cause shocks and vibrations and an uneven running of the vane rotor, particularly in strong winds. This is one of the reasons why the known windmills of the horizontal type are not suitable for running at high speeds as are required, for instance, for driving an electric generator. Furthermore, the known windmills of the horizontal type have difficulty in starting at a light and changing wind since generally it will take a full revolution of the vane rotor before all of the vanes have swung into the correct position for the wind direction concerned and before that time the vanes can only produce a restricted driving couple.

SUMMARY OF THE INVENTION

The invention has for its main object to provide a mill, particularly a windmill, of the indicated type which obviates the disadvantages of the known mills of this type and which runs smoothly also in strong winds, has an increased starting torque and operates with a higher efficiency.

To accomplish these objectives, the mill of the invention comprises a stationary annular gear member and a plurality of gear means supported by the vane rotor and each coupled to one of the vane shafts which gear means each engage the stationary annular gear member and provide a transmission ratio greater than one between its associated vane shaft and this gear member, each gear means further including a unidirectional free-wheel clutch or drive means. The annular gear member may consist of an externally toothed ring gear in which case the gear means comprise pinions engaging this ring gear and coupled to the vane shafts through the free-wheel drive means.

When in the operation of the windmill a vane moves with the rotating vane rotor from a position past the lee-side of the rotor first against the wind, then past the weather side of the rotor and then in its operating position before the wind again towards the lee-side, the free-wheel drive is not engaged and the pinion moves freely along the toothed ring gear without obstructing the free angular movements of the vane shaft and the vane secured thereto with respect to the vane rotor. However, when the vane reaches the lee-side of the mill and, under the pressure of the wind, is caused to gybing, the free-wheel drive engages coupling the vane shaft to the pinion whereby the pressure of the wind on the turning vane generates a driving torque on the vane rotor against the reaction of the stationary ring gear until the vane has reached a position parallel to the direction of the wind and the free-wheel drive again disengages. By a proper selection of the above-mentioned transmission ratio between the pinion and the toothed ring gear it is possible to provide that this vane position parallel to the wind is obtained before the vane has moved about the rotor axis through an angle of more than 90° from the initial gybing position. In practice, a transmission ratio between the vane shaft and the stationary ring gear of about 3/2 to 2 has provided good results.

The gybing movement of the vanes thus does not occur with a sudden movement but more smoothly and with a speed which depends on the above-mentioned transmission ratio and, of course, on the rotating speed of the vane rotor of the mill. Also in mills in which the stop means hold the vanes in a radial operating position, the arrangement of the invention has the result that the vanes transmit a driving torque to the vane rotor through an angle of rotation of this rotor of more than 180°, for instance approximately 250°. Furthermore, the mill starts more easily and with a greater starting torque because from whatever direction the wind blows there will always be one or more vanes which the wind will swing about in the gybing direction and which thus supply a starting torque in the correct rotational direction.

Although the invention is primarily intended for use in windmills, the invention could also be advantageously used in watermills.

BRIEF DESCRIPTION OF THE DRAWINGS

The present invention will be more readily understood when read in conjunction with the accompanying drawings, in which.

DESCRIPTION OF THE PREFERRED EMBODIMENTS

Figure 1:
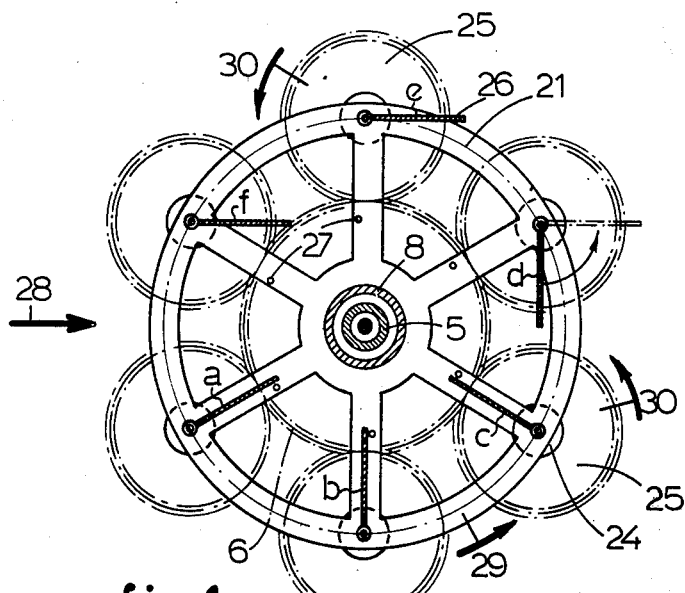
FIGS. 1–3 show in a horizontal section on the line I—I of FIG. 4 a first embodiment of a windmill of the horizontal type according to the invention in three successive positions of the rotating vane rotor, in which embodiment the vane shafts extend parallel to the vertical mill shaft.

Referring to the FIGS. 1–4, the windmill of the horizontal type there shown has a frame comprising a base plate 1 and a horizontal circular frame plate 3 supported on the base plate by means of a number of vertical legs 2. The frame plate 3 has a central bore 4 in which the lower end of a vertically extending tubular support 5 is fixedly secured. An externally toothed ring gear 6 encloses the frame plate 3 circumferentially and is fixedly secured thereto.

The tubular support member 5 rotatably supports a vane rotor, generally indicated by 7, comprising a tubular hub in which the support 5 is received which hub carries at its upper end a head plate 9 which by means of six spokes 10 supports an upper ring 11. The hub 8 has at its lower end a flange 12 which supports by means of six spokes 13 a lower ring 14, the lower spokes 13 extending in the same radial planes as the upper spokes 10. A cross plate 15 is secured in the bore of the tubular hub 8 and a mill shaft 16 extends centrally through the hub 8 and through the tubular support 5, the axis of this mill shaft thus forming the central axis of the mill. The mill shaft 16 is welded at its upper end to the head plate 9 and is further welded to the cross plate 15 which it penetrates, the mill shaft thus forming a unitary structure with the vane rotor 7. The mill shaft 16 is rotatably supported in the support member 5 by means of a combined thrust and radial bearing 17 at the upper end of this member and a radial bearing 18 at the lower end thereof. The mill shaft 16 is coupled at its lower end to an electric generator 19 mounted against the lower side of the frame plate 3 between the frame legs 2.

A plurality of vane shafts 20 extend in a circular array between the vane rotor rings 11 and 14 and are rotatably mounted in these rings by means of bearings 22 and 23, respectively. In the embodiment of FIGS. 1–4 there are six vane shafts 20 extending vertically in the radial planes through the spokes 10 and 13 and thus arranged on an imaginary circle 21 coaxial with the central axis of the mill and equally spaced at angular distances of 60°. Each vane shaft 20 extends downwardly through the lower vane rotor ring 14 and supports at its lower end a gear means comprising a free-wheel drive 24 constituted by a unidirectional free wheel clutch and a toothed pinion 25 which engages the stationary toothed ring gear 6. The pinions 25 associated with the six vane shafts 20 all have the same radius, the arrangement being such that the ratio between the radius of the ring gear 6 and the pinion radius is greater than 1 and preferably as shown, approximately 3:2. The free-wheel drives 24 are similarly arranged for all vane shafts 20. Thus, when the vane rotor 7 is rotated, the pinions 25 engaging the stationary ring gear 6 are rotated about their axes with a speed depending on the rotational speed of the rotor 7 and the above-mentioned transmission ratio. As long as the vane shafts 20 are held stationary with respect to the vane rotor 7 or are rotated at a smaller speed than the associated pinions 25, the free-wheel drives 24 do not engage and the vane shafts 20 and pinions 25 rotate independently of each other. However, when the vane shafts 20 are subjected to a driving force in the same rotational sense as the pinions 25 the free-wheel drives 24 will engage and operatively connect the vane shafts 20 to the pinions 25 as soon as the rotational speed of the vane shaft has increased to that of the associated pinion.

Secured to each vane shaft 20 is a vane 26 which vanes, as shown, may consist of a rectangular rigid flat plate. However, the vanes may also be formed as a rigid rectangular frame with a flexible sheet or sail stretched taut therein, or the vane may be carried out as a rigid body of suitable cross-sectional profile. Each vane is fixed along one side edge to its associated vane shaft 20 so as to be freely rotatable, together with its vane shaft, in the vane rotor 7. However, the vane rotor 7 is provided with a stop member for each vane 20 which stop members are formed by vertical rods 27 extending between and at their ends secured to the spokes 10 and 13 radially inwardly of the vane shafts 20. When a vane 26 abuts its associated stop rod 27 it occupies an operating position extending radially inwardly from its vane shaft 20.

Figure 3:
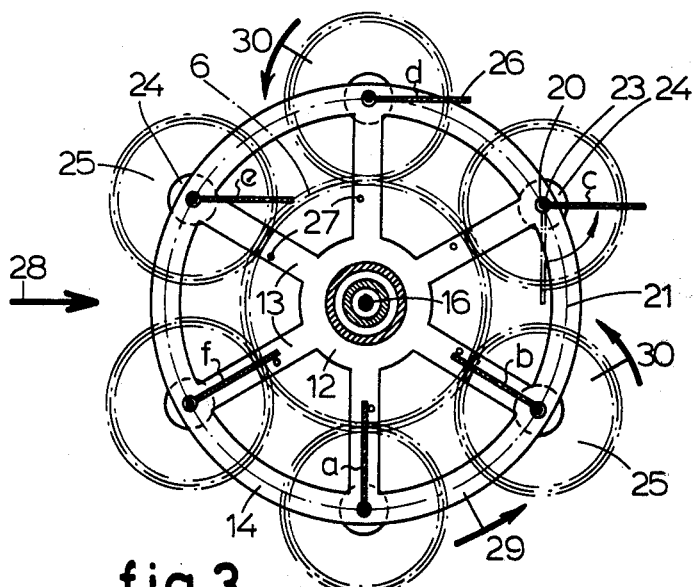
Figure 4:
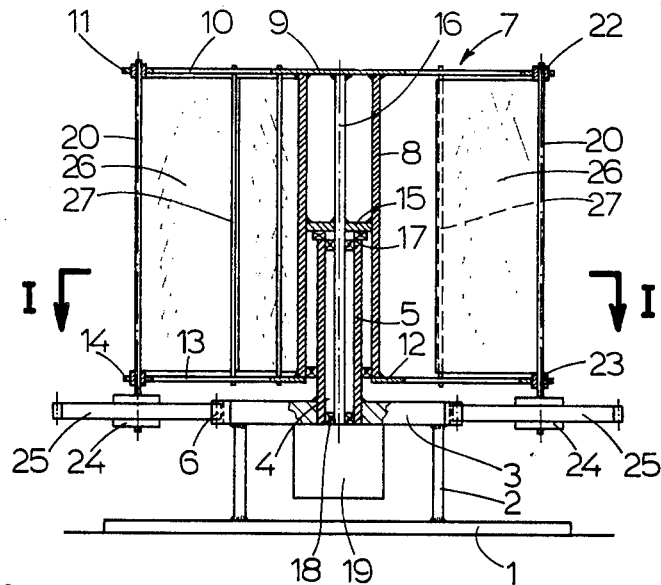
FIG. 4 is a vertical section on the line IV—IV of FIG. 2 of the mill of FIGS. 1–3.

The operation of the above-described windmill will be explained with reference to the FIGS. 1, 2 and 3 in which figs. the six vanes 26 are additionally indicated by a, b, c, d, e and f. Assuming that the wind blows in the direction of the arrow 28, the vanes a, b and c, in the vane rotor position of FIG. 1, are pressed against their associated stop rods 27 whereby they are held in their operating positions at an angle to the wind and thus drive the vane rotor 7 in the direction of the arrow 29. The rotation of the vane rotor 7 is transmitted to the generator 19 through the mill shaft 16. The vanes e and f moving against the wind take a position parallel to the wind and free of their associated stop rods 27. The vane d carries out a gybing movement in the same rotational direction as the pinions 25 are rotated (arrow 30) by their engagement with the stationary ring gear 6. The gybing vane d of FIG. 1 is thus being moved by the pressure of the wind from its operating position in abutment with its stop rod 27 to its free position parallel to the wind.

The rotating vane rotor 7 causes the pinions 25 to roll along the stationary ring gear 6 in which the free-wheel drives 24 associated with the vanes a, b, c and e, f allow the pinions 25 to rotate freely in the direction of the arrows 30 without transmitting their rotation to the associated vane shafts 27. However, at the gybing vane d which is being turned by the pressure of the wind, the associated free-wheel drive 24 now operatively couples the vane shaft 20 to the pinion 25 whereby the vane *d* now applies a driving torque to the pinion 25 and thus assists in driving the vane rotor 7.

Figure 2:
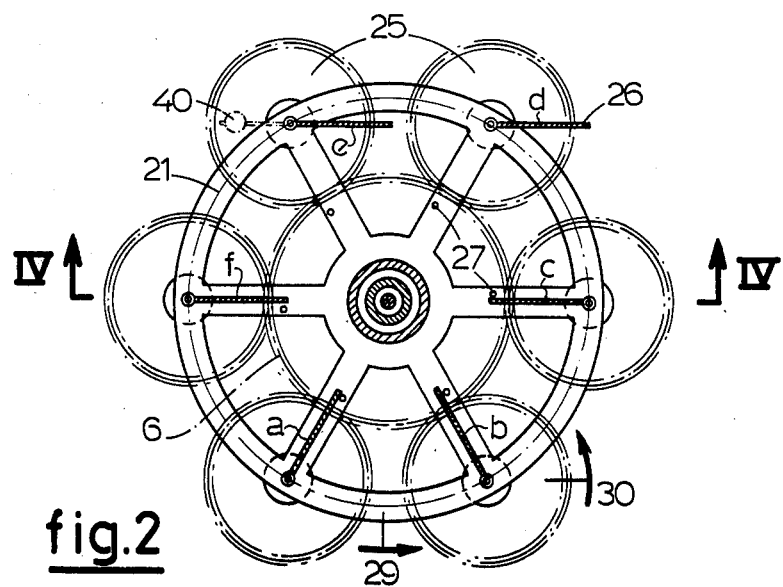

FIG. 2 shows the position of the vane rotor 7 in which the vane *d* has reached its position parallel to the wind and in which the associated free-wheel drive 24 has again disengaged the vane shaft 20 and the pinion 25. Because of the selected ratio of 3:2 of the radii of the gear ring 6 and the pinions 25, the vane *d* reaches this free position parallel to the wind when the vane rotor 7 has moved through an angle of 72° from its position in which the vane *d* started its gybing movement, the vane position now occupied by the vane *c* of FIG. 2. In FIG. 2, the vane *f* has just reached its operating position in abutment with its stop rod 27. FIG. 3 shows a situation similar to that of FIG. 1, in which however the vane rotor 7 has progressed through an angle of 60° and the gybing vane *c* occupies the same position as the vane *d* of FIG. 1.

It follows from the foregoing that the vanes contribute to the driving couple of the mill in their movement through a total angle of about 250° of the circumference of the vane rotor 7. The turning of the gybing vanes on the lee-side of the mill occurs without sudden shocks and the energy released by this gybing movement is used for driving the vane rotor 7. The mill thus not only functions more smoothly and with greater efficiency but can also be operated at greater speeds than the conventional windmills of the horizontal type. If, after a calm, the vane rotor 7 has stopped and the vanes have turned to random positions, a subsequent gust of wind of any direction will generally find one or more vanes which occupy the gybing position with respect to the direction of the wind and which by their gybing movement provide sufficient torque to start the rotation of the vane rotor 7. The mill of the invention thus has a much better starting torque than conventional windmills of the present type.

Figure 5:
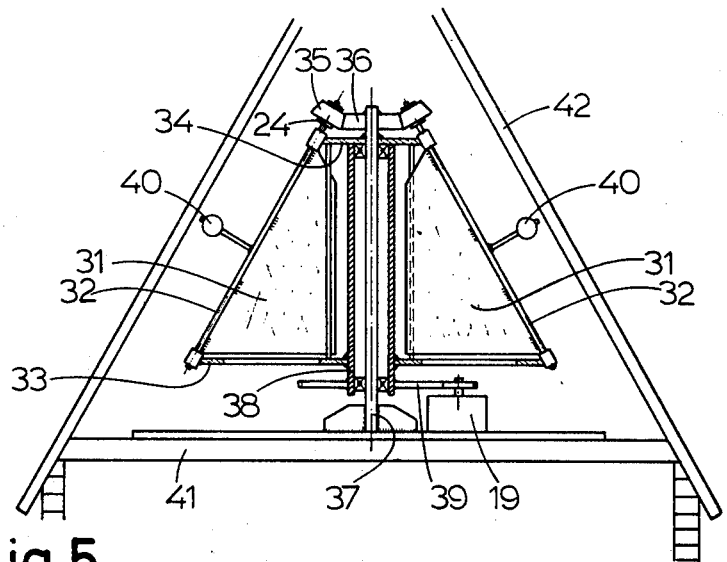
FIGS. 5 and 6 show two further embodiments of the windmill in which the vane shafts are inclined with respect to the vertical mill shaft.
Figure 6:
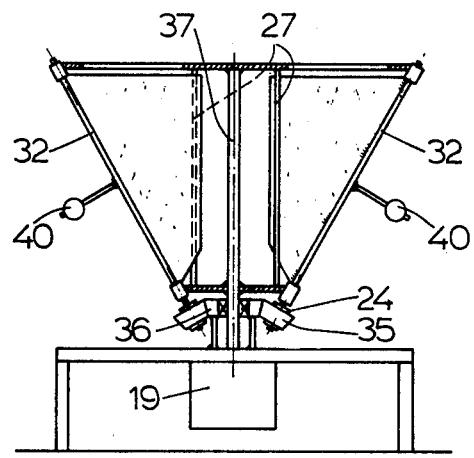
Figure 7:
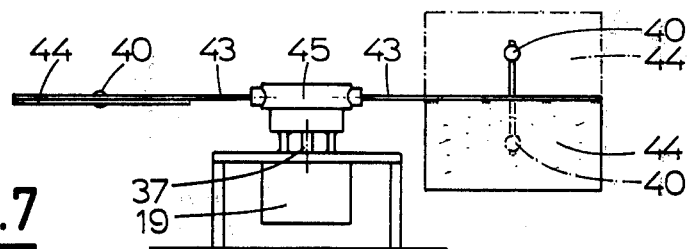
FIG. 7 shows a fourth embodiment of a windmill with horizontal vane shafts.

The FIGS. 5, 6 and 7 illustrate schematically that the vane shafts need not be positioned parallel to the vertical mill shaft although the latter embodiment, as shown in FIGS. 1-4, is to be preferred in most cases.

FIG. 5 shows an embodiment of the windmill of the invention having substantially triangular vanes 31 and upwardly converging inclined vane shafts 32 which are rotatably mounted in head plates 33 and 34 of a vane rotor of conical shape. The upper ends of the inclined vane shafts 32 are coupled, through free-wheel drives 24 of the same type as above described, with bevel pinions 35 engaging a central bevel gear 36. This bevel gear 36 is non-rotatably secured on a centrally arranged shaft 37 fixedly mounted in the mill frame and extending through a tubular mill shaft 38 rotatably mounted thereon by suitable bearings. The mill shaft 38 supports the conical vane rotor and, through a gear transmission 39, drives an electric generator 19. The vanes 31 are balanced by counter weights 40 secured to the vane shafts 32 to allow the vanes 31 to turn more easily to the position parallel to the wind. The mill of FIG. 5 operates in a similar way as the mill of FIGS. 1-4 and, by its shape, is suitable for installation on a loft floor of a house having an open triangular roof 42.

The embodiment of the mill of FIG. 6 is intended for installation in an open field. It has the same general shape and arrangement as the mill of FIG. 5 but turned upside down. The inclined vane shafts 32 of the triangular vanes 31 thus converge downwardly. In this case, however, the central mill shaft 37 supporting the vane rotor is rotatably mounted and drives the generator 19 which is centrally located directly underneath the mill shaft 37. Because the lower layers of the wind moving close to the ground generally provide only little driving force as compared with the higher layers, in this embodiment the triangular vanes 31 are arranged with their wide part uppermost in order to save place and to decrease the mass of the vanes.

FIG. 7 illustrates schematically that it is also possible to use horizontally extending vane shafts 43. The mill of this embodiment has a vane rotor 45 formed as a cylindrical housing containing the gear means with free-wheel drives and the stop means for the vane shafts 43 which extend radially outwardly from this housing. The mill shaft 37 extends downwardly from the housing 45 to drive the generator 19. The vane shafts 43 support rectangular vanes 44 and counter weights 40 for these vanes. These counter weights may be so selected that in the operating position the vanes either extend vertically downward (as shown in full lines) or extend vertically upward (as shown in broken lines) from the vane shaft. When moving against the wind, the vanes occupy a substantially horizontal position.

It is pointed out that also in the preferred embodiment of the windmill shown in the FIGS. 1-4 light counter weights 40 for the vanes 26 can be used to advantage, as shown with dotted lines in FIG. 2. In this case, however, the counter weights serve to hold the vanes in the positions shown at *d*, *e* and *f* of FIG. 2 parallel to the wind against the action of the centrifugal forces when the vane rotor 7 is running at high speed.

While the invention has been illustrated and described with reference to specific embodiments thereof, it will be understood that other embodiments may be resorted to within the scope of the invention, in particular as regards the structure and arrangement of the gear means 25 with free-wheel drive 24. If, for instance, the diameter of the stationary ring gear 6 and consequently also the diameter of the pinions 25 would become too large, it is possible to couple each vane shaft 20, through a right-angled gear transmission, to a radially inwardly extending shaft suspended to the vane rotor 7 and connected at its inner end to a free-wheel drive and gear means of small dimensions which cooperates with a stationary gear of relatively small diameter.

Because of the better control and efficient use of the forces acting on the gyping vanes, the mill according to the invention — as compared to the known mills of the present type — cannot only be operated at higher speeds but can also be built with a vane rotor of larger diameter and with larger effective vane surfaces in order to generate more power.

What is claimed is:

1. A windmill, intended to be driven by a flow of fluid, comprising
    a stationary frame having a central axis;
    a vane rotor rotatably mounted in said frame coaxially with said central axis;
    a plurality of vane shafts rotatably mounted in said vane rotor in a circular array about said central axis;
    a plurality of vane members each fixedly secured to one of said vane shafts for rotation therewith with respect to said vane rotor, each vane member having at least a major portion thereof extending to one side of its associated vane shaft;

a plurality of vane stop means on said vane rotor each associated with one of said plurality of vane members for defining an operating position of each vane member in engagement with its associated stop means whereby, when orienting the mill in a flow of fluid with said frame axis perpendicular to the direction of flow, said fluid flow will swing some of said plurality of vane members about their vane shafts to their operating positions to drive said vane rotor and will tend to swing the remaining vane members to a position parallel to said flow;

an annular member fixedly secured to said frame coaxially with said central axis, said annular member comprising a circular gear track; and a plurality of gear means supported by said vane rotor and coupled to one of said plurality of vane shafts, respectively, each of said gear means including a unidirectional free-wheel clutch means, and each of said gear means engaging said circuar gear track, the transmission ratio between each gear means and said gear track being greater than one.

2. The mill of claim 1 in which said transmission ratio between each gear means and said fixed gear track is approximately 3/2 to 2.

3. The mill of claim 1 in which said annular member is a toothed ring gear, said plurality of gear means each comprising a toothed pinion engaging said ring gear and coupled to its associated vane shaft through said free-wheel clutch means.

4. The mill of claim 1 in which said annular member comprises a friction gear ring, said gear means comprising friction wheels engaging said friction gear ring and each coupled to its associated vane shaft through said free-wheel clutch means.

5. The mill of claim 1 further comprising a mill shaft mounted for rotation in said frame in a vertical position coaxially with said central frame axis, said mill shaft supporting and being secured to said vane rotor, and said annular member and said gear means engaging said member being arranged closely below said vane rotor.

6. The mill of claim 1 further comprising counter weights for said vane members secured to said vane shafts on the side of said shafts opposite of said vane member major portion.

7. The mill of claim 1 in which said vane shafts extend in radial planes through said central axis, said stop means including stop members arranged substantially in said radial planes between said vane shafts and said central axis.

8. The mill of claim 7 in which said vane shafts extend substantially parallel to said central axis, said vane members each having a substantially rectangular shape.

9. The mill of claim 7 in which said vane shafts are inclined at equal angles to said central axis, said vanes having a substantially triangular shape.

10. The mill of claim 9 in which said central axis extends vertically and said inclined vane shafts converge upwardly.

11. The mill of claim 9 in which said central axis extends vertically and said inclined vane shafts converge downwardly.

12. The mill of claim 9 in which said annular member and said gear means are located on the side of said vane rotor to which said inclined vane shafts converge.

13. The mill of claim 1 in which said vane shafts extend radially outwardly from said vane rotor perpendicularly to said central axis, said stop means defining operating positions for said vane members in which said vane members extend substantially in radial planes passing through said central axis.

14. A windmill of the horizontal type comprising
a stationary frame having a vertical central axis;
a mill shaft rotatably mounted in said frame coaxially with said central axis and projecting upwardly from said frame;
a vane rotor supported by said mill shaft and secured thereto for common rotation, said vane rotor comprising an upper circular ring member and a lower circular ring member;
a plurality of vane shafts extending between said upper and lower vane rotor ring members and rotatably mounted in said members, said vane shafts being arranged equally angularly spaced in a circular row, each vane shaft extending in a radial plane of said central axis;
a plurality of vane members each having a side edge and each fixedly secured to one of said vane shafts adjacent said side edge;
a plurality of vane stop members secured to said vane rotor substantially radially inwardly of said vane shafts, respectively, each stop member determining an operating position for its associated vane member in which the latter abuts the stop member;
an annular toothed gear ring fixedly secured to said frame coaxially with said central axis;
a plurality of gear means supported by said vane rotor and each associated with one of said plurality of vane shafts, each gear means comprising
a toothed pinion engaging said toothed ring gear, the ratio between the radius of said ring gear and the radius of said pinion being greater than 1 and preferably between 3/2 and 2; and
a free-wheel clutch means connecting said pinion to the vane shaft associated therewith.

15. The mill of claim 14 in which said mill shaft is drivingly coupled to an electric generator.

* * * * *